US009780830B2

(12) United States Patent
Lu et al.

(10) Patent No.: US 9,780,830 B2
(45) Date of Patent: Oct. 3, 2017

(54) FAST CROSSTALK LIMITATION BETWEEN MODEMS

(75) Inventors: Chenguang Lu, Sollentuna (SE); Per-Erik Eriksson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 199 days.

(21) Appl. No.: 14/342,258

(22) PCT Filed: Aug. 31, 2011

(86) PCT No.: PCT/EP2011/064989
§ 371 (c)(1),
(2), (4) Date: Feb. 28, 2014

(87) PCT Pub. No.: WO2013/029671
PCT Pub. Date: Mar. 7, 2013

(65) Prior Publication Data
US 2014/0226454 A1 Aug. 14, 2014

(51) Int. Cl.
*H04J 3/10* (2006.01)
*H04B 3/32* (2006.01)
(Continued)

(52) U.S. Cl.
CPC ............. *H04B 3/32* (2013.01); *H04B 3/487* (2015.01); *H04M 11/062* (2013.01); *H04L 5/00* (2013.01)

(58) Field of Classification Search
CPC ....................................................... H04L 5/00
(Continued)

(56) References Cited

U.S. PATENT DOCUMENTS 8,588,051 B2 * 11/2013 Eriksson ................ H04B 3/487
370/201
2009/0175156 A1 * 7/2009 Xu .......................... H04B 3/32
370/201
(Continued)

FOREIGN PATENT DOCUMENTS

| CN | 101170531 A | 4/2008 |
|----|-------------|--------|
| CN | 101404520 A | 4/2009 |
| WO | WO-2012018289 | 2/2012 |

OTHER PUBLICATIONS

Office Action and China Search Report from foreign counterpart China Patent Application No. 201180074477.9, dated Dec. 15, 2014, 6 pages.
(Continued)

*Primary Examiner* — Mohammad Anwar
*Assistant Examiner* — Angel Brockman
(74) *Attorney, Agent, or Firm* — Nicholson De Vos Webster & Elliott LLP

(57) ABSTRACT

A device for limiting crosstalk between vectoring modems connected to a group of communication lines comprises a subgroup determining element that obtains information of the division into subgroups, each subgroup being made up of lines experiencing cross-talk from each other, and assigns operational pilot sequences to the group according to the division, an operational sequence transmission control element that transmits the operational sequences on the lines to the modems, which sequences are mutually orthogonal to each other and each communication line receives a corresponding sequence, and a corrective action determining element that obtains cross-talk measurements related to the transmitted operational pilot sequences and determines, for each subgroup, cross-talk and corrective action based on measurements made for a number of sequence symbols,
(Continued)

which number corresponds to the minimum number required for obtaining mutually orthogonal pilot sequences within the subgroup.

23 Claims, 7 Drawing Sheets

(51) Int. Cl.
    *H04M 11/06* (2006.01)
    *H04B 3/487* (2015.01)
    *H04L 5/00* (2006.01)
(58) Field of Classification Search
    USPC .......................................................... 370/201
    See application file for complete search history.

(56) References Cited

U.S. PATENT DOCUMENTS

2010/0159841 A1   6/2010   Barberis et al.
2010/0303136 A1   12/2010  Ashikhmin et al.
2011/0096870 A1   4/2011   Schenk et al.

OTHER PUBLICATIONS

PCT Written Opinion of the International Searching Authority, Application No. PCT/EP2011/064989, Aug. 7, 2012, 5 pages.

"Series G: Transmission Systems and Media, Digital Systems and Networks", Digital sections and digital line system—Access networks, Self-FEXT cancellation (vectoring) for use with VDSL2 transceivers, ITU-T, G.993.5, Apr. 2010, 80 pages.

"Series G: Transmission Systems and Media, Digital Systems and Networks", Digital sections and digital line system—Access networks, Very high speed digital subscriber line transceivers 2 (VDSL2), ITU-T G.993.2, Feb. 2006, 252 pages.

\* cited by examiner

$$\begin{matrix}
+1 & +1 & +1 & +1 & +1 & +1 & +1 & +1 \\
+1 & -1 & +1 & -1 & +1 & -1 & +1 & -1 \\
+1 & +1 & -1 & -1 & +1 & +1 & -1 & -1 \\
+1 & -1 & -1 & +1 & +1 & -1 & -1 & +1 \\
+1 & +1 & +1 & +1 & -1 & -1 & -1 & -1 \\
+1 & -1 & +1 & -1 & -1 & +1 & -1 & +1 \\
+1 & +1 & -1 & -1 & -1 & -1 & +1 & +1 \\
+1 & -1 & -1 & +1 & -1 & +1 & +1 & -1 \\
\end{matrix}$$  IS

FIG. 11

FAST CROSSTALK LIMITATION BETWEEN MODEMS

CROSS-REFERENCE TO RELATED APPLICATIONS

This application is a National stage of International Application No. PCT/EP2011/064989, filed Aug. 31, 2011, which are hereby incorporated by reference.

TECHNICAL FIELD

The invention relates to reducing crosstalk between vectoring modems connected to communication lines. More particularly, the invention relates to a method, device and computer program product for limiting crosstalk between vectoring modems connected to a group of communication lines.

BACKGROUND

Modems like Digital Subscriber Line (DSL) modems are normally connected to a device for providing access to a data communication network. Such a device is typically a Digital Subscriber Line Access Multiplexer (DSLAM) and the communication network may be the Internet. One particular type of standard that may be of interest is Very-high-speed Digital Subscriber Line 2 (VDSL2).

When being connected in this way the modems are connected to the device via separate communication lines, typically conductor pairs made of copper. These lines are furthermore often bundled together in a cable. This means that the communication lines are often placed very close to each other. There is in this regard a problem in that a communication line may be subject to crosstalk from one or more neighbouring communication lines. This limits the communication capability in that the rate at which data is transmitted is limited.

There has in recent years evolved techniques for reducing the influence of crosstalk, for instance in relation to VDSL2. VDSL2 has been standardized by the Telecommunication Standardization Sector of the International Telecommunications Union (ITU-T) in recommendation G.993.2.

ITU-T has issued a further recommendation G.993.5, specifying vectoring for VDSL2. Vectoring is a technique for Far-end crosstalk (FEXT) cancellation where the transmission and/or reception on communication lines where VDSL2 is used are jointly processed at the DSLAM side. In the downstream direction pre-coding is used, which pre-distorts the transmitted signals in such a way so that the crosstalk into other lines is cancelled as the signal propagates along the cable.

In the upstream direction the received signals are post-processed to cancel the FEXT. The VDSL2 FEXT crosstalk is the stationary noise that most severely limits the performance of VDSL2 systems. The vectoring recommendation provides a way to estimate the FEXT channel in both downstream and upstream and utilize the estimated crosstalk channel to cancel the crosstalk. Vectoring enables the offering of 100 Mbps from the last hundreds meters to users over DSL lines.

This technique thus provides a significant improvement for DSL modems.

One important application for vectoring technology will be FTTCab (Fiber-To-The-Cabinet). Usually, a few hundreds of lines are connected from a cabinet to the modems of the users. In the cabinet, the lines are connected to a DSLAM unit, which may comprise several DSLAMs. The hundreds of lines going out from the cabinet are normally separated in a few cables of up to 100 lines in each cable. Crosstalk between the cables is usually negligible. However, a very large vectoring system is needed if the lines from each cable can not be separated and connected to separate smaller vectoring systems. The typical number of lines of one vectoring system at the cabinet that operators request is 192 or 384, which are the maximum number of lines served by one cabinet in most cases. Such a vectoring system may comprise of several DSLAMs coordinated by a vectoring engine.

The coefficients in downstream pre-coder and upstream crosstalk canceller are usually updated by an adaptive algorithm, e.g. least mean square (LMS), assisted by channel estimation. For a large vectoring system, channel estimation takes a very long time. For example, for 192 lines, it can take about 16 seconds for one round of channel estimation, without considering feedback time and processing time. This would result in long training time during vectoring initialization and long tracking time in showtime. This may be undesirable in some scenarios and unacceptable for some users.

There is therefore a need for improvement in this regard.

SUMMARY

The invention is therefore directed towards providing a faster determination of a corrective activity such as setting of pre-coder and cross-talk canceller coefficients.

This object is according to a first aspect of the invention achieved through a method for limiting crosstalk between vectoring modems connected to a group of communication lines interconnecting the modems with a data network accessing device. The method comprises:
obtaining information of the division of the communication lines into subgroups, where each subgroup is made up of lines experiencing cross-talk from each other above a cross-talk level threshold,
assigning a set of operational pilot sequences to the group of communication lines according to the division into subgroups,
transmitting the set of operational pilot sequences on the communication lines between the vectoring modems and the data network accessing device, where the pilot sequences are mutually orthogonal to each other at least within each subgroup, and where each communication line receives a corresponding operational pilot sequence,
obtaining a set of cross-talk measurement sequences related to the transmitted set of operational pilot sequences, and
determining, for each subgroup, crosstalk and a corrective action based on measurements made for a number of sequence symbols. In this determining the number corresponds to the minimum number required for obtaining mutually orthogonal pilot sequences within the subgroup.

This object is according to a second aspect achieved by a device for limiting crosstalk between vectoring modems connected to a group of communication lines interconnecting the modems with a data network accessing device. The cross-talk limiting device comprises:
a subgroup determining element that
obtains information of the division of the communication lines into subgroups, where each subgroup is made up of lines experiencing cross-talk from each other above a cross-talk level threshold, and assigns a set of operational pilot sequences to the group of communication lines according to the division into subgroups, an operational sequence transmission control element that provides the transmission of the set of operational pilot sequences on the communication lines between the vectoring modems and the data network accessing device, where these pilot sequences are mutually orthogonal to each other at least within each subgroup and each communication line receives a corresponding operational pilot sequence, and a corrective action determining element that obtains a set of cross-talk measurement sequences related to the transmitted set of operational pilot sequences, and determines, for each subgroup, cross-talk and a corrective action based on measurements made for a number of sequence symbols. This number corresponds to the minimum number required for obtaining mutually orthogonal pilot sequences within the subgroup.

This object is according to a third aspect of the invention also achieved through a computer program product for limiting crosstalk between vectoring modems connected to a group of communication lines interconnecting the modems with a data network accessing device. The computer program product comprises computer program code on a data carrier which when run on a processor forming a pilot sequence transmission control unit of a device for limiting cross-talk, causes the pilot sequence transmission control unit to:

obtain information of the division of the communication lines into subgroups, where each subgroup is made up of lines experiencing cross-talk from each other above a cross-talk level threshold, assign a set of operational pilot sequences to the group of communication lines according to the division into subgroups, provide the transmission of a set of operational pilot sequences on the communication lines between the vectoring modems and the data network accessing device, where the pilot sequences are mutually orthogonal to each other at least within each subgroup, obtain a set of cross-talk measurement sequences related to the transmitted set of operational pilot sequences, and determine, for each subgroup, cross-talk and a corrective action based on measurements made for a number of sequence symbols. The number corresponds to the minimum number required for obtaining mutually orthogonal pilot sequences within the subgroup.

The corrective action performed through the invention may involve updating the coefficients in a downstream pre-coder and upstream crosstalk canceller.

The invention has a number of advantages. It speeds up the determination of a corrective activity through accelerating the channel estimation process. Another advantage is that the processing may be made faster. This allows the corrective action to be implemented faster and also allows the device to react more quickly on cross-talk.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which:

FIG. 5 shows a number of general operational pilot sequences assigned to the communication lines in FIG. 1 according to a first assignment principle, FIG. 6 schematically shows an example of specific operational pilot sequences in the form of a Hadamard matrix assigned according to the first assignment principle to the communication lines of FIG. 1, FIG. 7 schematically shows a number of general shortened pilot sequences assigned to the communication lines according to a second assignment principle, FIG. 8 schematically shows an example of specific operational pilot sequences according to the second assignment principle, FIG. 9 schematically shows a flow chart of a number of method steps in a general method for limiting cross-talk according to a first embodiment of the invention, FIG. 10 schematically shows a number of method steps in a method for limiting crosstalk according to a second embodiment of the invention, FIG. 11 schematically shows a set of investigation pilot sequences used for obtaining operational pilot sequences, FIG. 12 schematically shows a number of method steps in a method for limiting crosstalk according to a third embodiment of the invention, and FIG. 13 schematically shows a computer program product in the form of a CD ROM disc with a computer program performing the functionality of the invention when being loaded into a device limiting cross-talk.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention concerns the reduction of cross-talk between vectoring modems, which are connected to a device for limiting crosstalk between the vectoring modems. In the description of different variations of the invention that follows this device is provided as a part of a network access device. The device provides access to the Internet and any other data services like data streaming services such as Internet Protocol Television (IPTV) for Digital Subscriber Line (DSL) modems. The network access device will in the following be described in relation to a Digital Subscriber Line Access Multiplexer (DSLAM). Such a device is thus a device that provides access to a data communication network for the modems. It should however be realised that the device for limiting crosstalk can be provided as a separate device and need not be combined with the network access device.

Figure 1:
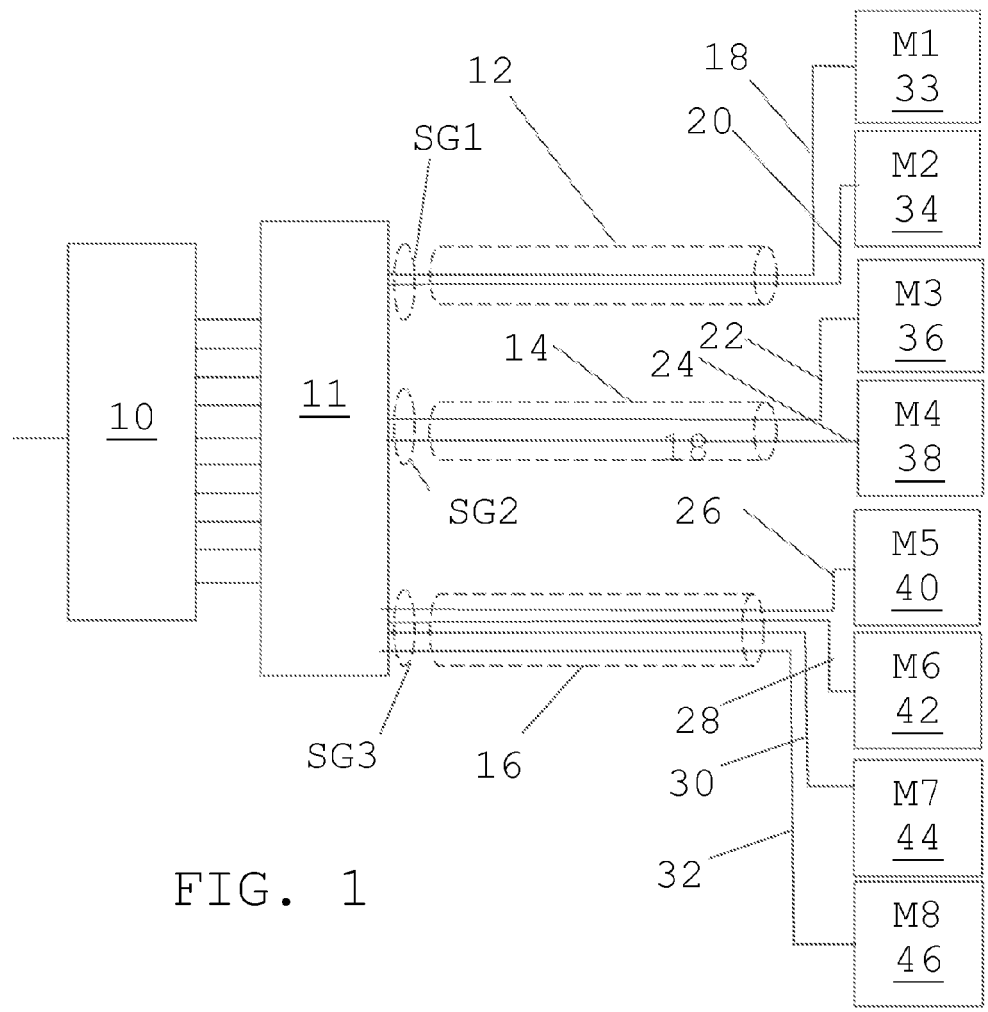
FIG. 1 schematically shows eight modems connected to a device for limiting cross-talk via communication lines in three different cables.

FIG. 1 schematically shows a network access device 10, which here also acts as a device for limiting cross-talk. The device 10 is as an example provided in the form of a DSLAM and being connected to a number of modems 33, 34, 36, 38, 40, 42, 44 and 46. The device 10 is here connected to one end of each of a group of communication lines and the modems 33, 34, 36, 38, 40, 42, 44 and 46 are connected to opposite ends of the communication lines. The modems are here DSL modems and are furthermore vectoring modems. The group here comprises a first, second, third, fourth, fifth, sixth, seventh and eighth communication line 18, 20, 22, 24, 26, 28, 30 and 32. These communication lines, which may be Plain Old Telephone Service (POTS) communication lines may be conductor pairs made of copper, and may furthermore be bundled together in cables. More specifically, a POTS line is usually an unshielded twisted-pair copper line.

The communication lines furthermore interconnect the modems with the DSLAM 10. In the figure there are three such cables 12, 14 and 16, where a first and a second modem M1 33 and M2 34 are connected to the DSLAM 10 via the first and second communication lines 18 and 20 in a first cable 12, a third and a fourth modem M3 36 and M4 38 are connected to the DSLAM 10 via the third and fourth communication lines 22 and 24 in a second cable 14 and a fifth, sixth, seventh and eighth modem M5 40, M6 42, M7 44 and M8 46 are connected to the DSLAM 10 via the fifth, sixth, seventh and eighth communication lines 26, 28, 30 and 32 in a third cable 16. The first and second communication lines 18 and 20 here form a first subgroup SG1, the third and fourth communication lines 22 and 24 form a second subgroup SG2, while the fifth, sixth, seventh and eighth communication lines 26, 28, 30 and 32 form a third subgroup SG3. The communication lines are furthermore not directly connected to the DSLAM 10, but are connected to it via a so-called distribution frame 11. Because the interconnection wiring in the distribution frame is usually unknown, it is hard for the DSLAM 10 to gain knowledge of which communication lines are provided in which cables.

Figure 2:
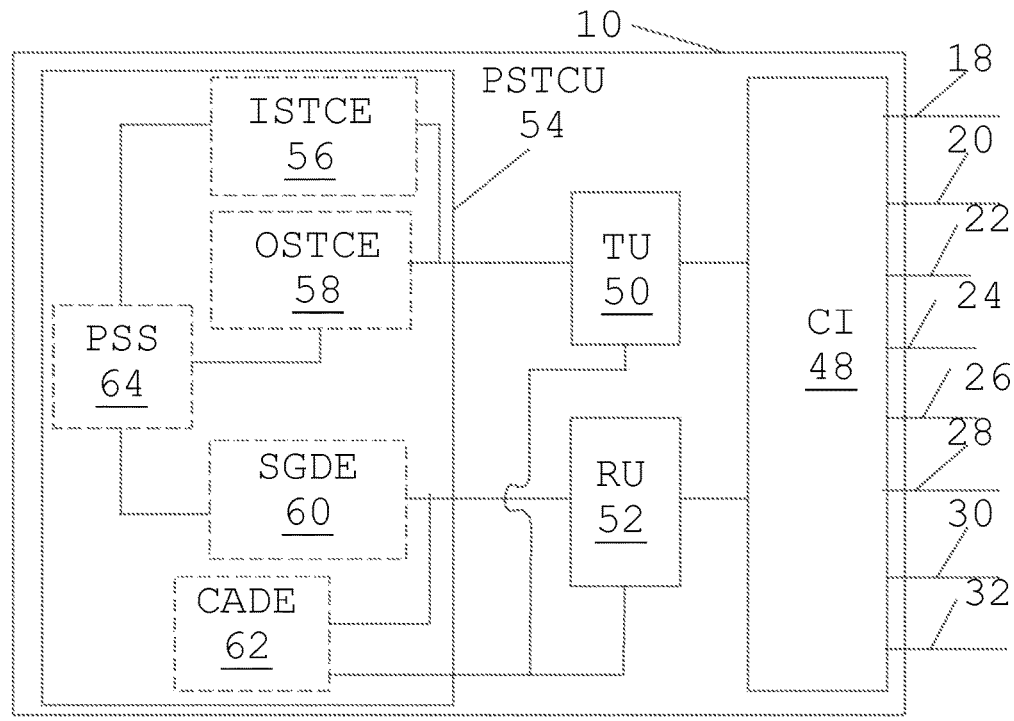
FIG. 2 shows a simplified block schematic of the device in FIG. 1.

A block schematic of some units of the DSLAM 10 that are provided for explaining the invention are shown in FIG. 2. The DSLAM 10 comprises a pilot sequence transmission control unit 54 connected to a communication interface 48 via a transmitting unit 50 as well as via a receiving unit 52. The communication interface 48 is in turn connected to each of the communication lines 18, 20, 22, 24, 26, 28, 30 and 32, which is normally done via the distribution frame. However the distribution frame has here been omitted in order to provide a clearer understanding of the invention. The pilot sequence transmission control unit 54 furthermore includes a number of elements. There is here an investigating sequence transmission control element ISTCE 56 and an operational sequence transmission control element OSTCE 58, which are both connected to the transmitting unit 50 as well as to a pilot sequence store PSS 64. In the pilot sequence transmission control unit 54 there is furthermore a subgroup determining element SGDE 60 connected between the pilot sequence store 64 and a signal output of the receiving unit 52 as well as a corrective action determining element CADE 62 connected to the signal output of the receiving unit 52 and to control inputs of the transmitting and receiving units 50 and 52. As can be seen in FIG. 2, the operational sequence transmission control unit 58 is also connected to the subgroup determining element 60.

The invention will in the following furthermore be described in relation to Very-high-speed Digital Subscriber Line 2 (VDSL2), which is a preferred environment in which the invention may be provided. It should however be realized that the invention is not limited to this standard either. This standard is generally described in the recommendation G.993.2 that has been issued by The Telecommunication Standardization Sector of the International Telecommunications Union (ITU-T). The recommendation G.993.2 is herein incorporated by reference.

As has been mentioned earlier, ITU-T has issued a further recommendation G.993.5, which specifies how vectoring can be used in VDSL2. Also this later recommendation G993.5 is herein incorporated by reference.

Vectoring is a powerful tool for raising the throughput of data carried on communication lines such as POTS lines. It has the advantage of cancelling crosstalk between communication lines, which increases the throughput and thus the available bandwidth of a modem.

To cancel the crosstalk by vectoring, the knowledge of the channel is needed. It is well known that using mutually orthogonal pilot sequences to the modems can facilitate the channel estimation process. This approach is also adopted in ITU-T G.993.5. One factor that influences crosstalk levels is in what cables a communication line is provided. Communication lines provided in the same cable will cause more crosstalk to each other than communication lines in different cables. In most cases, the crosstalk between different cables is very low and thereby negligible.

Furthermore as was mentioned above a DSLAM does normally not have the knowledge about which communication line is provided in which cable. This has a major influence on the length of pilot sequences used, something which will be described in more detail later. Because of this the pilot sequences used may become very long, which delays the determining and performing of a corrective action, such as crosstalk cancellation or limitation.

Figure 3:
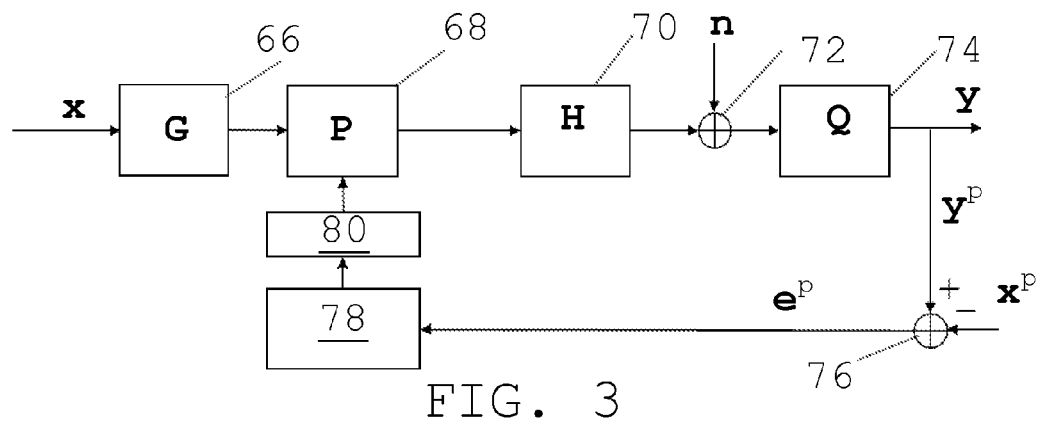
FIG. 3 shows a block schematic of a vectoring system model, FIG. 4 schematically shows a superframe with a number of data symbols, where one is used for transmitting a pilot sequence symbol.

FIG. 3 schematically shows a simplified block diagram of the principles of a downstream vectoring system (ITU-T G.993.5 compliant) based on a frequency-domain system model. Note that FIG. 3 only shows the principle of vectoring explaining how a vectoring system works to cancel out the crosstalk from a theoretical point of view and that an actual system may be somewhat different. The system here comprises a gain scaler G 66 at the input of which there is provided transmitted Quadrature Amplitude Modulation (QAM) signals x for all communication lines. The gain scaler 66 provides a way to fine tune the power of the signal from each communication line. It is connected to a pre-coder P 68, which pre-distorts the signal of one line with the signals of other lines so that the signals of the other communication lines or the crosstalk are pre-cancelled. After the precoder 68, the precoded signals are transmitted through the channel of DSL lines, H 70. In addition to the channel 70, the desired signals are also interfered by added background noise n. The added noise is for illustrative purposes shown as being provided via an adding unit 72 connected to the channel 70. The adding unit 72 is also shown as being connected to a frequency domain equalizer Q 74. Such an adding unit will of course not be present in a real vectoring system. The frequency domain equalizer 74 which recovers the signals to the original constellation by compensating the effects of the direct channel (i.e. line attenuation and phase shift) and the gain scaling of G 66. As a result, the output signals y of the equalizer Q 74 are the recovered QAM signals which are ready to decode for each line. To assist channel estimation, in ITU-T G.993.5, an error signal $e^p$ between the received pilot signal $y^p$ and a known transmitted pilot signal $x^p$ are transmitted back to a channel estimator 78 via a back channel, where the error signal is formed using a subtracting unit 76. The channel estimator 78 in turn is connected to a least mean square (LMS) unit 80 that drives a LMS algorithm. The LMS unit 80 is connected to the pre-coder P 68 to update the precoder coefficients.

It should be noted that a similar system model as above can be applied for the upstream. The main difference is that in upstream the error samples are available at the DSLAM side and the crosstalk canceller is performing post-processing before the frequency domain equalizer.

Assume an N-line downstream vectoring system, i.e. a system where there are N communication lines. Then the received signal of all communication lines at any tone in downstream can be mathematically modeled as $$y = QHPGx + Qn \quad (1)$$

Where the received signal $y=[y_1\ y_2\ \ldots\ y_N]^T$ is an N×1 vector representing the received signals of all communication lines and $y_i$ is the received signal of communication line i, $Q=\text{diag}([q_1\ q_2\ \ldots\ q_N])$ is an N×N diagonal matrix representing the FEQ (frequency domain equalizer) matrix at the receivers of all communication lines where $q_i$ is the FEQ coefficient of communication line i, $H=[h_1\ h_2\ \ldots\ h_N]$ is an N×N matrix representing the channel matrix where $h_j=[h_{1j}\ h_{2j}\ \ldots\ h_{Nj}]^T$ is the $j^{th}$ column vector of H and the off-diagonal elements $h_{ij}$ when i≠j are the crosstalk coefficients from communication line j to communication line i while the diagonal elements $h_{ii}$ are the direct channel coefficients of communication line i, $P=[p_1\ p_2\ \ldots\ p_N]$ is an N×N matrix representing the pre-coding matrix where $p_j=[p_{1j}\ p_{2j}\ \ldots\ p_{Nj}]^T$ is the $j^{th}$ column vector of P, $G=\text{diag}([g_1\ g_2\ \ldots\ g_N])$ is an N×N diagonal matrix representing the gain scaling matrix at the transmitters where $g_i$ is the gain scaling factor of communication line i that includes all gain scaling, e.g. PSD (Power Spectral Density) mask and fine gain scaling, the transmitted signal $x=[x_1\ x_2\ \ldots\ x_N]^T$ is an N×1 vector representing a transmitted signal vector of all the communication lines (existing vectored lines and joining lines) where $x_i$ is the transmitted signal of communication line i, and $n=[n_1\ n_2\ \ldots\ n_N]^T$ an N×1 vector representing the background noise where $n_i$ is the background noise before the FEQ at a modem of communication line i.

As shown in FIG. 3, an LMS algorithm provided by LMS unit 80 is usually used to update the pre-coder 68 to cancel out the crosstalk between communication lines. The LMS algorithm is driven by channel estimation assisted by the error sample feedback ($e^p$) from the modem side. After a few iterations, the pre-coder converges to the zero-forcing pre-coder $$P = H^{-1}Q^{-1}G^{-1} \quad (2)$$

Take the pre-coder in (2) to (1), the received signal can then be expressed as $$y = x + Qn \quad (3)$$

The crosstalk terms are cancelled out. Therefore, the system achieves single line performance. It should be noted that the above system model is only for one tone. It can be easily extended in the multi-tone case.

To facilitate channel estimation, ITU-T G.993.5 reuses and modifies the VDSL2 sync symbols defined in ITU-T G.993.2 as pilot symbols. In downstream, the modems feedback to the DSLAM the errors between the received pilot symbols and the known pilot symbols, which are also referred to as normalized error samples in ITU-T G.993.5.

Figure 4:
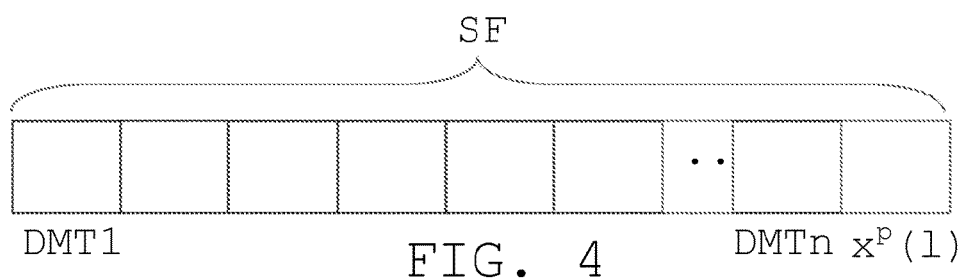

FIG. 4 schematically shows a superframe SF as specified by G.993.2. with a number of signals, where the signals are discrete multitone (DMT) symbols being modulated on tones. There may here typically be 257 DMT symbols in such a superframe SF, where 256 DMT1-DMTn are used for ordinary data and the last, i.e. the $257^{th}$ symbol, is a special symbol which is referred to as sync symbols in ITU-T G.993.2. According to the ITU-T recommendation G.993.5 the sync symbols are used to carry the pilot sequence. More specifically, some tones of the sync symbols carry the pilot sequence. Therefore a number of consecutive superframes provide pilot sequences that are orthogonal to each other for different lines. Given the DMT symbol is 250 μs long, the distance between two symbols in a pilot sequence is here typically about 64 ms. If the pilot sequence length is considered to be L, then in FIG. 4 there is shown $x_i^p(l)$, the pilot symbol with pilot index l where l ranges from 0 to L−1 and L is the length of the pilot sequence. The pilot symbols furthermore typically have a value of +1 or −1 modulated to some tones of the sync symbol defined in ITU-T G.993.2. The pilot symbols are circularly repeated in time.

As mentioned above, the modems do provide signals indicative of crosstalk coupling in the communication lines based on these pilot sequences.

These signals indicative of cross-talk coupling are typically in the form of error samples, which are used by the DSLAM to estimate a FEXT channel in order to calculate pre-coder and cross-talk canceler coefficients used for cancelling crosstalk when transmitting to the modems.

In the following, without loss of generality and to simplify the denotation, we assume a one-tone system to explain how to use error sample to perform channel estimation. It can be easily extended to the multi-tone case.

If we first define the pilot sequence of communication line i as $$t_i = [t_i(0) t_i(1) \ldots t_i(L-1)]^T \quad (4)$$

where $t_i(l)$ is the pilot element or symbol with pilot index l, then the pilot symbol of any communication line i at one tone at the time with pilot index l can be expressed as $$x_i^p(l) = t_i(l)s \quad (5)$$

where s denotes the corresponding tone of the sync symbol (more details regarding sync symbol can be seen in Section 10.5 in ITU-T G.993.2).

The error sample at that tone at the time with pilot index l can be expressed as $$e_i^p(l) = y_i^p(l) - x_i^p(l) \quad (6)$$

where $y_i^p(l)$ denotes the received pilot symbol at that tone at the time with pilot index l.

Define an error sample vector at that tone on communication line i as $$e_i^p = [e_i^p(0) e_i^p(1) \ldots e_i^p(L-1)] \quad (7)$$

Define the effective downstream channel between x and y as $$\bar{H} = QHPG \quad (8)$$

where each element $\bar{h}_{ij}$ denotes the effective channel coefficient from communication line j to communication line i. Then the error sample vector in equation (7) can be expressed as $$e_i^p = \bar{h}_{row,i}T^Ts - t_i^Ts + q_i(n_i^p)^T \quad (9)$$

where $\bar{h}_{row,i}$ is the $i^{th}$ row vector of $\bar{H}$, $T=[t_1\ t_2\ \ldots\ t_N]$ denotes the pilot sequence matrix, and $n_i^p = \lfloor n_i^p(0)\ n_i^p(0) \ldots n_i^p(L-1) \rfloor$ denotes the noise on the pilot symbols.

It is possible to use so-called Hadamard sequences as pilot sequences. When Hadamard sequences are used, the pilot sequences are mutually orthogonal, such as $$t_i^T t_j = \begin{cases} 0, & \text{when } i \neq j \\ L, & \text{when } i = j \end{cases} \quad (10)$$

Utilizing the mutual orthogonality property in equation (10), the effective channel coefficients $\bar{h}_{ij}$ defined in equation (8) can be easily estimated via cross-correlation of error samples and the pilot sequences as $$\hat{\bar{h}}_{ij} = \begin{cases} \dfrac{e_i^p t_j}{Ls}, & \text{when } i \neq j \\ \dfrac{e_i^p t_j}{Ls} + 1, & \text{when } i = j \end{cases} \quad (11)$$

The channel estimates can be used to drive an adaptive algorithm (e.g. LMS algorithm) to update the pre-coding coefficients.

Construction of a Hadamard matrix is normally used to construct Hadamard sequences. A Hadamard matrix is a square matrix where the column vectors are mutually orthogonal. So the column vectors are Hadamard sequences which can be used as pilot sequences.

There are several ways to construct Hadamard matrices. Sylvester's method is an example of a well-known method to generate a Hadamard matrix of order $2^k$ for any integer $k \geq 2$. It is conjectured that there exists a Hadamard matrix of order $4k$ for any positive integer k. So far, the current smallest unknown order of multiples of 4 is 668.

As an example, Sylvester's method is the easiest way to construct a Hadamard matrix. A Hadamard matrix of order $2^k$ can be generated from the second order Hadamard matrix iteratively.

First, the second order Hadmard matrix is given as $$H_2 = \begin{bmatrix} +1 & +1 \\ +1 & -1 \end{bmatrix} \quad (12)$$

Then a Hadamard matrix of order $2^k$ (where k is an integer and $k \geq 2$) can be constructed as $$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \quad (13)$$

where $\otimes$ denotes the Kronecker product. Therefore, to generate N Hadamard sequences by Sylvester's method, the required minimum order is $L=2^{\lceil \log_2 N \rceil}$ where $\lceil \log_2 N \rceil$ means that $\log_2 N$ is rounded up towards the nearest higher integer.

As can thus be seen the DSLAM transmits one pilot sequence per communication line where pilot sequences may be mutually orthogonal pilot sequences in the form of Hadamard sequences and the modems respond with error samples that are used for cancelling cross-talk on the communication lines.

Figures 5, 6:
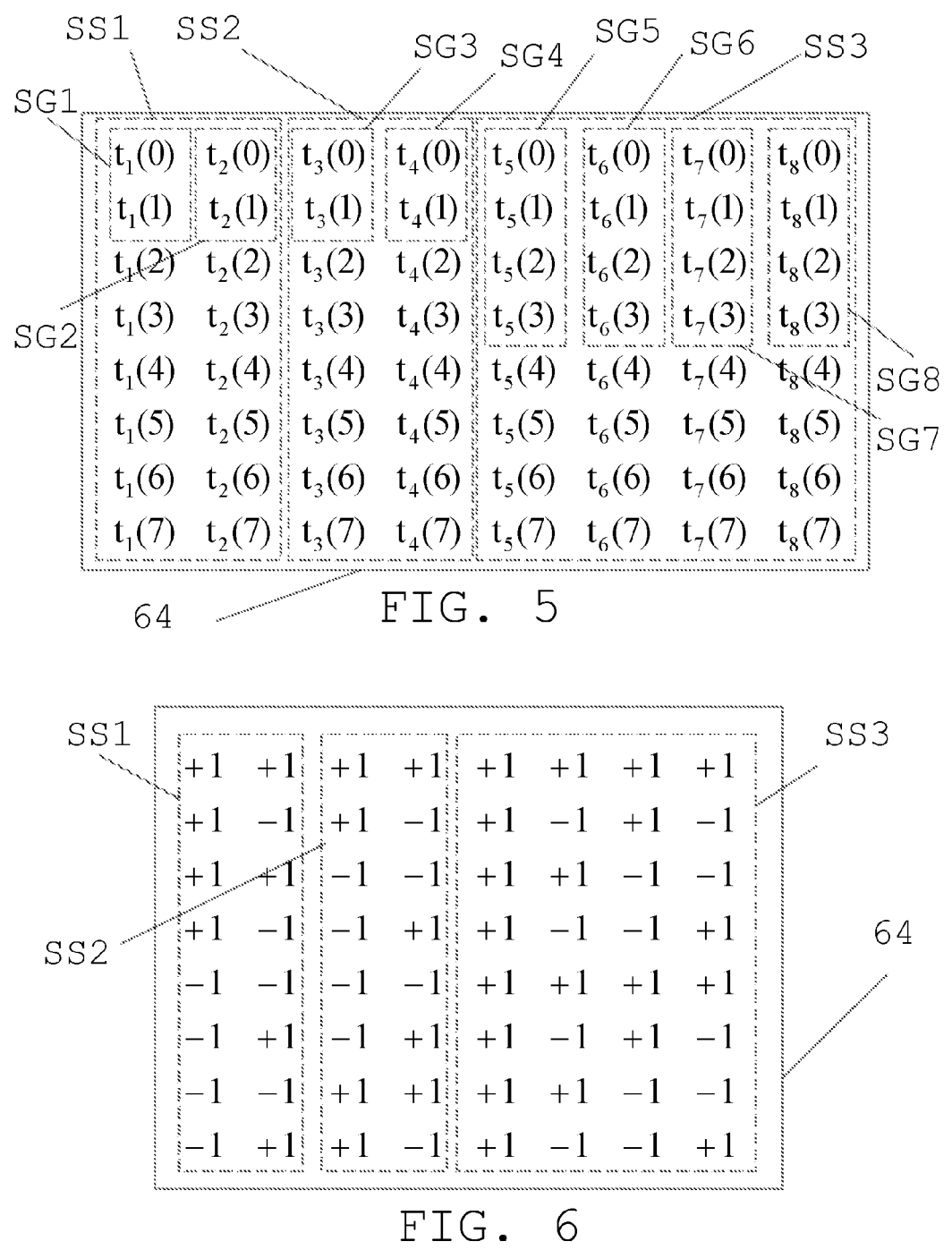

FIG. 5 schematically shows a general Hadamard matrix being provided in the pilot sequence store 64 for the exemplifying communication lines shown in FIG. 2, while FIG. 6 shows a specific example of such a Hadamard matrix. The general Hadamard matrix comprises a first pilot sequence in a first column, where this first pilot sequence comprises pilot sequence symbols $t_1(0)$, $t_1(1)$, $t_1(2)$, $t_1(3)$, $t_1(4)$ $t_1(5)$, $t_1(6)$ and $t_1(7)$. Then follows a second pilot sequence in a second column, where this second pilot sequence comprises pilot sequence symbols $t_2(0)$, $t_2(1)$, $t_2(2)$, $t_2(3)$, $t_2(4)$ $t_2(5)$, $t_2(6)$ and $t_2(7)$. After the second sequence follows a third pilot sequence in a third column, where this third pilot sequence comprises pilot sequence symbols $t_3(0)$, $t_3(1)$, $t_3(2)$, $t_3(3)$, $t_3(4)$ $t_3(5)$, $t_3(6)$ and $t_3(7)$ Then follows a fourth pilot sequence in a fourth column, where this fourth pilot sequence comprises pilot sequence symbols $t_4(0)$, $t_4(1)$, $t_4(2)$, $t_4(3)$, $t_4(4)$ $t_4(5)$, $t_4(6)$ and $t_4(7)$. After the fourth sequence follows a fifth pilot sequence in a fifth column, where this fifth pilot sequence comprises pilot sequence symbols $t_5(0)$, $t_5(1)$, $t_5(2)$, $t_5(3)$, $t_5(4)$ $t_5(5)$, $t_5(6)$ and $t_5(7)$. Thereafter follows a sixth pilot sequence in a sixth column, where this sixth pilot sequence comprises pilot sequence symbols $t_6(0)$, $t_6(1)$, $t_6(2)$, $t_6(3)$, $t_6(4)$ $t_6(5)$, $t_6(6)$ and $t_6(7)$. After the sixth sequence follows a seventh pilot sequence in a seventh column, where this seventh pilot sequence comprises pilot sequence symbols $t_7(0)$, $t_7(1)$, $t_7(2)$, $t_7(3)$, $t_7(4)$ $t_7(5)$, $t_7(6)$ and $t_7(7)$. Finally there is an eighth pilot sequence, where this eighth pilot sequence comprises pilot sequence symbols $t_8(0)$, $t_8(1)$, $t_8(2)$, $t_8(3)$, $t_8(4)$ $t_8(5)$, $t_8(6)$ and $t_8(7)$. These pilot sequences are operational pilot sequences assigned to the communication lines according to a first assignment principle. An operational pilot sequence is here a pilot sequence used for determining cross-talk and corrective action.

In the figure there are also indicated a first, second and third subset SS1, SS2 and SS3 of the Hadamard matrix, i.e. subsets of a set of operational pilot sequences. Here the first and second sequences make up a first subset SS1, the third and fourth sequences make up a second subset SS2 and the fourth, fifth, sixth, seventh and eighth sequences make up a third subset SS3 The first and second elements $t_1(0)$, $t_1(1)$, of the first pilot sequence $t_1(1)$ and are provided in a first segment SG1 of the first pilot sequence and the first and second elements $t_2(0)$ and $t_2(1)$ of the second pilot sequence $t_2(1)$ are provided in a second segment SG2 of the second pilot sequence, where the number of elements of the segments in the first subset SS1 may be the same and here as an example two. In a similar manner the first and second elements $t_3(0)$, $t_3(1)$, of the third and fourth pilot sequences $t_3(1)$ and are provided in a third segment SG3 of the third pilot sequence $t_3(1)$ and the first and second elements $t_4(0)$ and $t_4(1)$ of the fourth pilot sequence $t_4(1)$ are provided in a fourth segment SG4 of the second pilot sequence, where the number of elements of these segments in the second subset SS2 may be the same and here as an example also two. Furthermore, the first, second, third and fourth elements $t_5(0)$, $t_5(1)$, $t_5(2)$, $t_5(3)$, of the fifth pilot sequence $t_s(1)$ are provided in a fifth segment SG5 of the fifth pilot sequence, the first, second, third and fourth elements $t_6(0)$, $t_6(1)$, $t_6(2)$, $t_6(3)$ of the sixth pilot sequence $t_6(1)$ are provided in a sixth segment SG6 of the sixth pilot sequence, the first, second, third and fourth elements $t_7(0)$, $t_7(1)$, $t_7(2)$, $t_7(3)$ of the seventh pilot sequence $t_7(1)$ are provided in a seventh segment SG7 of the seventh pilot sequence and the first, second, third and fourth elements $t_8(0)$, $t_8(1)$, $t_8(2)$ and $t_8(3)$ of the eighth pilot sequence $t_8(1)$ are provided in an eighth segment SG8 of the eighth pilot sequence. Here the number of elements of all the segments in the third subset SS3 may also be the same and here as an example four. The significance of this will be described shortly.

FIG. 6 shows one realization of mutually orthogonal pilot sequence values for the pilot sequences exemplified in FIG. 5.

Since the pilot sequences are mutually orthogonal to each other it can be seen that there is a dependency between the length L of the mutually orthogonal pilot symbol sequences and the number of communication lines, which means that the more communication lines there are that can be assumed to interfere each other, the longer the pilot sequences need to become.

Operational pilot sequences having a certain length, here denoted L, are required. In case all communication lines have to be considered as causing crosstalk to each other, this means that very long operational pilot symbol sequences may be needed, which is exemplified in FIGS. 5 and 6. Because these lengths are required the determination of a corrective action, such as the determination of pre-coder coefficients in the downstream and cross-talk canceller coefficients in the upstream, takes long time.

From FIG. 1 it can be understood that the first, second and third cables 12, 14 and 16 with communication lines 18, 20, 22, 24, 26, 28, 30, 32 are connected to the DSLAM 10 via a distribution frame 11 in a random manner. The crosstalk typically takes place in the cable and at the distribution frame. Normally, the crosstalk from the distribution frame is negligible.

Therefore, for a vectoring system, it may only be necessary to cancel out the crosstalk from the communication lines in the same cable and perhaps even only from some communication lines in the same cable. In the ideal case, it is sufficient to connect the communication lines in the same cable to a smaller DSLAM, if the wiring information at the distribution frame is available. However, the wiring information is normally unavailable. Therefore a larger DSLAM system may be needed to cover all the communication lines from the cabinet. The large DSLAM system is usually referred to as system level vectoring.

This means that without information about which communication lines are experiencing cross-talk from each other, it is not possible to reduce the pilot sequence length. The invention is provided for solving this problem.

Figures 7, 8, 11:
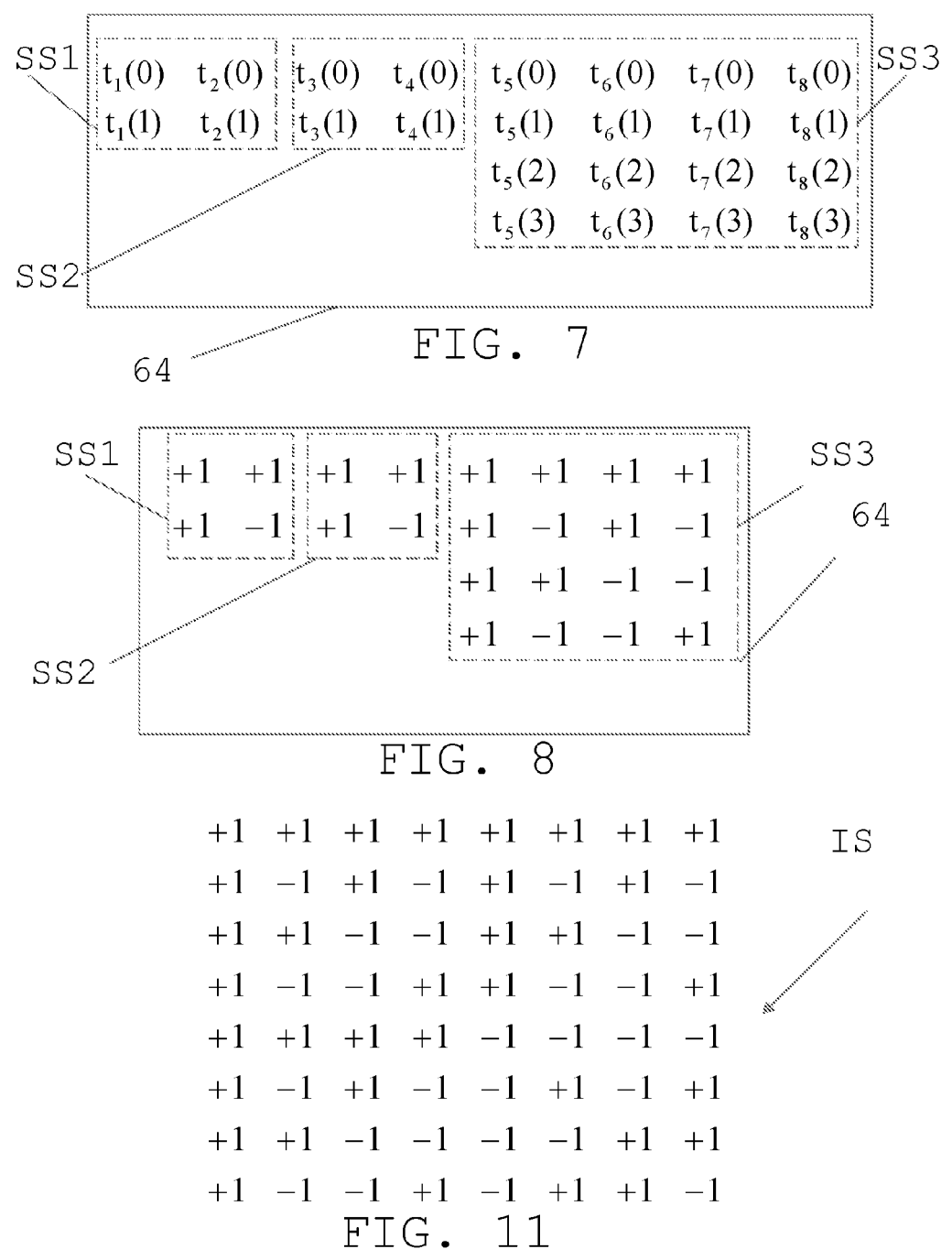

Shortened sequences according to a second assignment principle which could be used are shown in FIG. 7 and FIG. 8. As can be seen in FIG. 7 there is a first pilot sequence in a first column, where this first pilot sequence comprises pilot sequence symbols $t_1(0)$ and $t_1(1)$. Then follows a second pilot sequence in a second column, where this second pilot sequence comprises pilot sequence symbols $t_2(0)$ and $t_2(1)$. After the second sequence follows a third pilot sequence in a third column, where this third pilot sequence comprises pilot sequence symbols $t_3(0)$ and $t_3(1)$. Then follows a fourth pilot sequence in a fourth column, where this fourth pilot sequence comprises pilot sequence symbols $t_4(0)$ and $t_4(1)$.

After these four sequences follows a fifth pilot sequence in a fifth column, where this fifth pilot sequence comprises pilot sequence symbols $t_5(0), t_5(1), t_5(2)$ and $t_5(3)$. Thereafter follows a sixth pilot sequence in a sixth column, where this sixth pilot sequence comprises pilot sequence symbols $t_6(0), t_6(1), t_6(2)$ and $t_6(3)$. After the sixth sequence follows a seventh pilot sequence in a seventh column, where this seventh pilot sequence comprises pilot sequence symbols $t_7(0), t_7(1), t_7(2)$ and $t_7(3)$. Finally there is an eighth pilot sequence, where this eighth pilot sequence comprises pilot sequence symbols $t_8(0), t_8(1), t_8(2)$ and $t_8(3)$. Just as in FIGS. 5 and 6 the first and second pilot sequences form a first subset SS1 of operational pilot sequences, the third and fourth pilot sequences form a second subset SS2 of operational pilot sequences and the fifth, sixth, seventh and eighth pilot sequences form a third subset SS3 of operational pilot sequences. The lengths of the operational pilot sequences of a subset according to this second principle are here the same as the segment lengths for the same subset according to the first principle.

FIG. 8 shows an example of pilot sequence values for the pilot sequences in FIG. 7.

As is evident from FIGS. 5-8, operational pilot sequences may be assigned to the communication lines according to two principles. The assignment is according to both principles furthermore based on the division of the group of communication lines into subgroups.

The whole or complete group of communication lines connected to the DSLAM 10 are thus divided into subgroups and three such subgroups are shown in FIG. 1, a first subgroup SG1, a second subgroup SG2 and a third subgroup SG3. The subdivision is here thus the subdivision of which communication lines are provided in which cables.

According to the first assignment principle as exemplified in FIGS. 5 and 6, operational pilot sequences may be assigned to the communication lines having lengths that are equal to or longer than the minimum length for obtaining mutually orthogonal pilot sequences in the whole set.

This means that all operational pilot sequences are orthogonal to each other and thus also the pilot sequences assigned to a specific subgroup of communication lines, a subset of operational pilot sequences, are orthogonal to each other. Furthermore, in the assignment according to the first principle, the segments of a subset of pilot sequences comprise all shifted version of a number of continuous pilot sequences, where the number of elements of such a segment can be equal to or higher than the minimum number of elements for obtaining mutual orthogonality within a subgroup or subset and lower than the minimum number required for mutual orthogonality between all communication lines or the whole group or whole set. In the example in FIGS. 5 and 6, the number of elements in a segment of a subset is the minimum number required for mutual orthogonality within the subset. This is a preferred number of the first assignment principle. The operational pilot sequences of the whole group are all orthogonal to each other. Furthermore since the segments of a subset of pilot sequences comprises all shifted versions of a number of continuous pilot sequences, the segments may be provided from any consecutive elements of a pilot sequence. In the example in FIGS. 5 and 6, the segments of the first subset are made up of the first two symbols $t_1(0), t_1(1)$ $t_2(0)$ and $t_2(1)$ in the first and second sequences. However, as the segments may be shifted in relation to each other, other combinations can be used. The first segment SG may for instance be made up of the two symbols $t_1(0)$ and $t_1(1)$, while the second segment may be made up of the seventh and eight symbols $t_2(6)$ and $t_2(7)$.

If we assume a cabinet with N active communication lines in M cables and that there are $N_i$ active communication lines in cable i, where $$N = \sum_{i=1}^{M} N_i$$

and using Sylvester's method.

Without loss of generality, we further assume $N_{i+1} \geq N_i$, which means the size of cable i+1 is larger than or equal to that of cable i. Let's take $L_i = 2^{\lceil log_2 N_i \rceil}$. Then, generate a Hadamard matrix of order $$L = 2^{\lceil \log_2 \Sigma_i L_i \rceil}.$$

The pilot sequences for communication lines in cable i are taken from the column vectors of the submatrix from the $$\left(\sum_{j=1}^{i} L_{j-1} + 1\right)^{th}$$

column vector to the $$\left(\sum_{j=1}^{i} L_j\right)^{th}$$

column vector of the Hadamard matrix of L, where $L_0=0$. In this way, the length of all pilot sequences is L. To estimate the channel of the communication lines in cable i, only any $L_i$ continuous error samples is needed. This is due to the fact that the pilot sequences are cyclically mutual orthogonal over $L_i$ bits due to the property of the Hadamard matrices generated by Sylvester's method.

An example for the system in FIG. 1 is shown in FIG. 6. The Hadamard matrix of order 8 is shown in this figure. The first 2 column vectors are allocated to the first and second communication lines 22 and 24 in cable 12, the next 2 column vectors are allocated to the third and fourth communication lines 26 and 28 in cable 14 and the last four column vectors are allocated to the fifth, sixth, seventh and eighth communication lines 26, 28, 30, 32 in cable 16. It is easy to see that the column vectors in the submatrix of any cyclically adjacent 4 rows in the submatrix used for cable 16 are mutually orthogonal. Therefore, it is only necessary to take any 4 continuous error samples from each communication line in the third subgroup SG3 to estimate the channel of cable 16. The same can be seen for cable 12 and cable 14. It is only necessary to take any 2 continuous error samples from each communication line in the first and second subgroups SG1 and SG2 to estimate the channel of cable 12 and 14.

This means that error samples from a communication line are used to estimate the direct channel and the crosstalk channel from other lines to this channel. This can be done on a per-line basis. For example, error samples corresponding to the first and second elements $t_1(0)$, $t_1(1)$ of the first pilot sequence may be used in relation to the first communication line 18, while error samples corresponding to the second and third elements $t_2(1)$, $t_2(2)$ or even corresponding to the seventh and eighth elements $t_2(6)$, $t_2(7)$ of the second pilot sequence may be used in relation to the second communication line 20. In this way cross-talk is determined for each channel independently of the other channels. No need to do any combination between lines.

Since a limited number of error samples are needed to determine cross-talk, it is then possible to provide a corrective action faster than if error samples from all elements of a sequence is needed.

The second principle of assigning investigating pilot sequences is exemplified through FIGS. 7 and 8.

According to this second principle the assigned sequences have lengths that correspond to the number of communication lines in the subgroups. The lengths may furthermore correspond to the minimum length required for being mutually orthogonal. The lengths of the pilot sequences of a subset are here equal to or higher than the minimum length for obtaining mutual orthogonality within the subset or the corresponding subgroup and lower than the minimum length required for mutual orthogonality between all communication lines or the whole group or whole set. The length of the pilot sequences of a subset is in a preferred variation of the second assigning scheme equal to the minimum length for mutual orthogonality within the subset.

This also means that the lengths are selected to be sufficient for being mutually orthogonal with each other in the subgroups. This means that in the example in FIG. 7, each pilot sequence in a subset has a length that is the minimum length for providing orthogonality between all communication lines of the corresponding subgroup. The first, second, third and fourth pilot sequences are thus 2 symbols long, while the fifth, sixth, seventh and eighth pilot sequences are four symbols long.

This may also be described in the following way.

Assume a cabinet with N active communication lines in M cables and where there are $N_i$ active communication lines in cable i, where $$N = \sum_{i=1}^{M} N_i.$$

To create the required pilot sequences for $N_i$ lines in cable i, a straight-forward way is to use the pilot sequences from the Hadamard matrix of the smallest order $L_i \geq N_i$ generated by a selected construction method(s), e.g. Sylvester's method. This means that for a subgroup i, the length $L_i$ of the pilot sequences of the corresponding subset will be $L_i=2^{\lceil \log_2 N_i \rceil}$, if Sylvester's method is used for Hadamard matrix generation and where $\lceil \log_2 N_i \rceil$ means that $\log_2 N_i$ is rounded up towards the nearest higher integer. If the number of communication lines in different cables is unequal, the length of pilot sequences for the communication lines in different cables is different. If the number of communication lines in different cables is equal, pilot sequences for the communication lines in different cables may be exactly the same, as shown by the pilot sequences in FIG. 8 and used for the communication lines in the third cable. It should here be realized that other methods may be used than Sylvester's method. If another method is used $L_i$ can be as small as $L_i=4*\lceil N_i/4 \rceil$ (multiples of 4), where $\lceil N_i/4 \rceil$ means that $N_i/4$ is rounded up to the nearest higher integer. However, the Sylvester's method is of importance in practice for its implementation simplicity in hardware and software.

Figure 9:
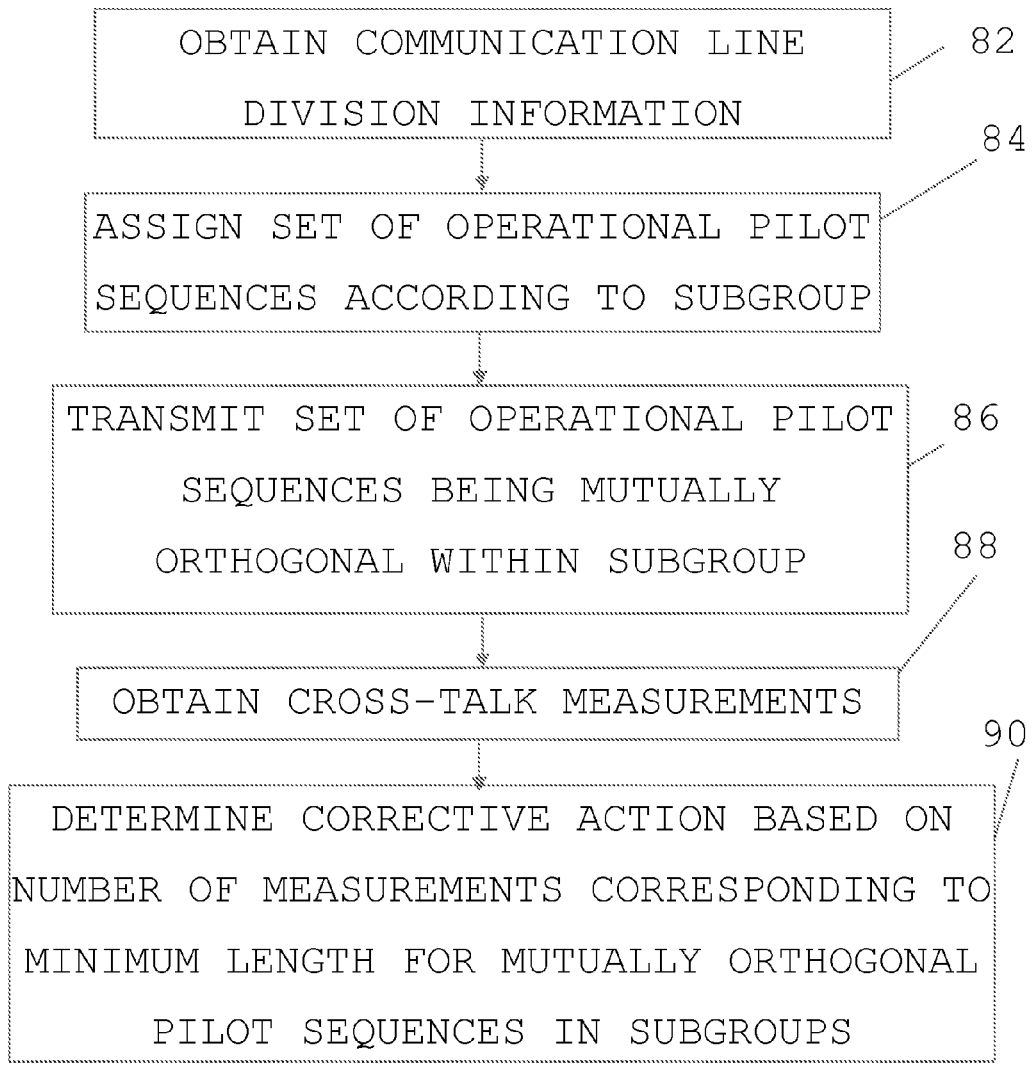

A first embodiment of the invention will now be described with reference being made to FIGS. 1, 2 and 9, where FIG. 9 shows a flow chart of a number of method steps being performed by the pilot sequence transmission control unit 54 of the device 10 for limiting cross-talk according to a first embodiment of the invention.

The method starts with the pilot sequence transmission control unit 54 obtaining communication line division information, step 82. This information is information about subgroups into which the communication lines are divided. The whole group of communication lines connected to the DSLAM 10 are thus divided into subgroups and three such subgroups are shown in FIG. 1, a first subgroup SG1, a second subgroup SG2 and a third subgroup SG3. This information is more particularly supplied to the subgroup determining element 60. There are a number of ways in which this information can be obtained. In this first embodiment this information is provided by an operator of the system in which the communication lines 18-32 are provided. The operator may here present information about which communications lines are provided in which cables and this information may then be entered into the DSLAM by a DSLAM operator.

The subdivision is here thus the subdivision of which communication lines are provided in which cables.

The information can thus be information about which communication lines experience crosstalk in relation to each other, and can also be information about which communication lines are provided in which cables. This cross-talk can also be the cross-talk experienced above a certain threshold.

Based on the information the subgroup determining element 60 assigns a set of operational pilot sequences to the group of communication lines according to their division into subgroup, step 84. This assigning may be the assigning of pilot sequences according to the first principle or second principle as described above The assigned pilot sequences may then be stored in the pilot sequence store 64.

Thereafter the operational sequence transmission control element 58 may fetch the assigned operational pilot sequences and transmit each of them on a corresponding communication line via the transmitting unit 50 and communication interface 48 so that operational pilot sequences are transmitted that are mutually orthogonal to each other at least within each subgroup, step 86. The subset of operational pilot sequences are thus mutually orthogonal The operational sequence transmission control element 58 therefore provides the transmission of the set of operational sequences on the communication lines between the vectoring modems 33-46 and the DSLAM 10. Each communication line 18-32 therefore receives a corresponding operational pilot sequence. The operational pilot sequences need then only be as long as is required for being orthogonal within a subgroup as shown in FIG. 7.

The modems 33, 34, 36, 38, 40, 42, 44 and 46 then provide the DSLAM 10 with crosstalk measurements, i.e. in the form of error samples, which are received by the corrective action determining element 62 via the receiving unit 52 and the communication interface 48. In this way the corrective action determining element 62 obtains cross-talk measurements, step 88. The corrective action determining element 62 thus obtains a set of cross-talk measurement sequences related to the transmitted set of operational sequences. The corrective action determining element 62 then determines the cross-talk as well as a corrective action, i.e. crosstalk elimination or crosstalk limitation, for each subgroup based on a number of measurements made for a number of sequence symbols within the set of cross-talk measurement sequences, step 90, where this number corresponds to the minimum number for obtaining mutually orthogonal pilot sequences within each subgroup. It is thus possible that the corrective activity may be determined based on and sometimes only on the measurements corresponding to the minimum length for obtaining orthogonality within a subgroup or subset. Later measurements may be ignored.

This determination may start as soon as measurements are being received. It may also involve waiting until the above mentioned number of measurements have been received from the modems. In any case, the determination of crosstalk and corrective action may, depending on assignment principle, be finalised for a certain communication line of a certain subgroup with regard to a subset of operational pilot sequences provided for a corresponding subgroup of communication lines, as soon as the measurements or error samples made in relation to the segment of the corresponding pilot sequence with the first assignment principle or made in relation to the whole pilot sequence have been processed with the second assignment principle. Note that, in the following text, it implies using the first assignment principle when 'segment of pilot sequence' is referred in the crosstalk and corrective action determination process, while it implies using the second assignment principle when 'whole pilot sequence' is referred. This means that cross-talk cancellation and pre-coder settings may, depending on assignment principle, be obtained for a subgroup of communication lines as soon as the last measurement of the last segment of the subset has been processed or the last measurement of all pilot sequences of the subset have been received. The corrective action for a communication line can thus be implemented in time before a symbol following the last symbol of the segment or the last symbol of the pilot sequence has been received. The corrective activity may then be performed by the transmitting and receiving units 50 and 52 according to the determinations made by the corrective action determining element 62. As can be seen in FIGS. 5, 6, 7 and 8 it is enough to receive two measurements from each modem in the first and second subgroups SG1 and SG2 and four measurements from each modem in the third subgroup.

It can thus be seen that in the example given above a corrective action can be based on half or even a quarter of the measurements as compared with if all pilot sequences had to be orthogonal to each other, which is a considerable saving in processing time as well as processing resources.

It can thus be seen that since for a cabinet with multiple cables, to cancel out the crosstalk within each cable, it is only necessary to estimate the crosstalk channel of the communication lines in each cable. Therefore the pilot sequences, i.e. the parts of the pilot sequences used for channel estimation, only need to be mutually orthogonal on the communication lines in the same cable. In this way, the required number of pilot sequences (or the subset of the pilot sequences used for channel estimation) can be reduced and thereby the required pilot sequence length can be reduced. The number of error samples required for channel estimation can thereby be reduced. The channel estimation time can be reduced and thereby accelerate vectoring initialization and tracking processes.

Figure 10:
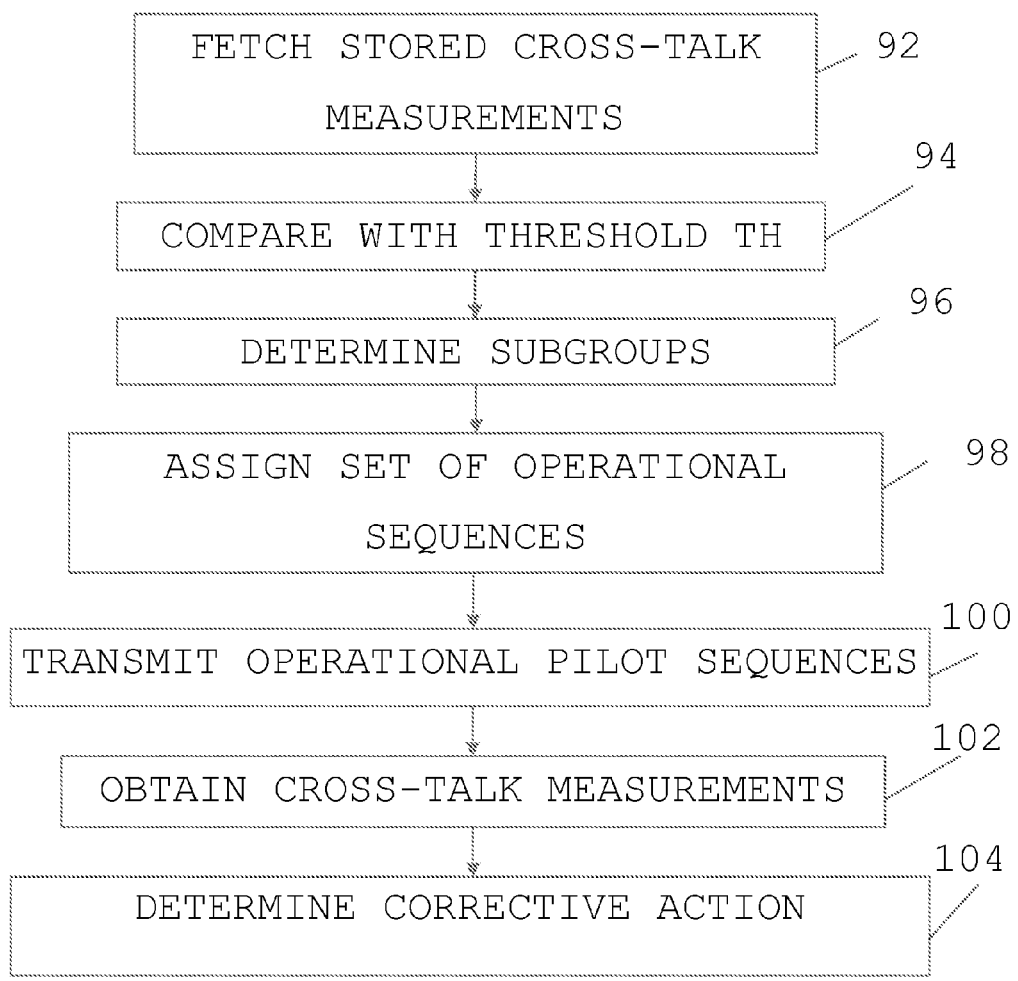

Now a second embodiment of the invention will be described with reference being made to FIG. 10.

Here once again the subgroup determining element 60 determines subgroups. In this embodiment the subgroup determining element 60 fetches stored crosstalk measurements, step 92, for instance from a cross-talk measurement store, which measurements may have previously been provided by the modems 33, 34, 36, 38, 40, 42, 44, 46 based on an earlier sent investigation pilot sequence. The cross-talk measurement store may be combined with the pilot sequence store so that the cross-talk measurements are stored in the store 64 together with such an already transmitted investigation sequence. An example of a number of such investigation pilot sequences is shown in FIG. 11. The measurements here correspond to the measurement results from a set of mutually orthogonal investigating pilot sequences. The subgroup determining element 60 then compares the cross-talk measurements with a cross-talk level threshold TH, step 94, which is a threshold set so that cross-talk values below the threshold are negligible. This level may correspond to the cross talk experienced by communication lines in separate cables. However, it may also correspond to cross-talk within a cable. This means that certain communication lines within a cable may experience cross-talk from each other below a threshold.

The communication line division information thus here comprises information of the cross-talk level measurements being below a certain threshold level. Such a threshold level may be set such that communication lines in different cables will experience cross-talk in relation to one another that is below the threshold level TH.

This type of determination is also known as using so-called crosstalk effect indicators (CEI), where a CEI can be calculated from channel estimation in the initialization. The CEI indicates how strong the crosstalker is to one communication line. With the information of the cable size (normally known by operators), it is thus possible to identify the communication lines that are provided in the same cable by finding the common set of the strongest crosstalkers.

Based on the comparison, and here on which communication lines that experience crosstalk above and below the threshold, the subgroup determining element 60 determines subgroups, step 96, which also in this case is exemplified by the first second and third subgroups SS1, SS2 and SS3.

Thereafter the subgroup determining element 60 continues and assigns a set of operational pilot sequences, step 98. The assigning may also here be according to either the first or the second principle. Also in the second embodiment the determination of cross-talk and corrective activity is made on a number of measurements in a set of cross-talk measurement sequences corresponding to the minimum required for obtaining mutually orthogonal pilot sequences within a subgroup.

Thereafter the sequences may be stored in the store 64 and the operational sequences are then transmitted under the control of the operational sequence transmission control element 58, step 100. This means that the sequences in the subsets SS1, SS2 and SS3 are then transmitted to the modems.

Thereafter cross-talk measurements are obtained or received, step 102, which measurements are received by the corrective action determining element 62 via the receiving unit 52 and communication interface 48. As soon as the cross-talk measurements made on a complete pilot sequence or a complete segment have been received, the corrective action determining element 62 may then start to determine crosstalk for the corresponding communication line and based on this determined cross-talk then also determine a corrective action, here crosstalk cancellation or limitation, for instance through determining pre-coder and cross-talk canceller settings, step 104. When the determination of the corrective action has been finalised, the settings are supplied to the transmitting unit 50 as well as to the receiving unit 52 for being applied. The corrective action determination is finalised in respect of a certain subset or subgroup as soon as sufficient measurements have been received and processed from the corresponding subgroup of communication lines. The determination may here be started as soon as a measurement is received or it may be started when all the required measurements are received. However, as soon as measurements relating to a complete pilot sequence or a whole segment have been received then the corrective activity in respect of the corresponding communication line may be finalised.

Figure 12:
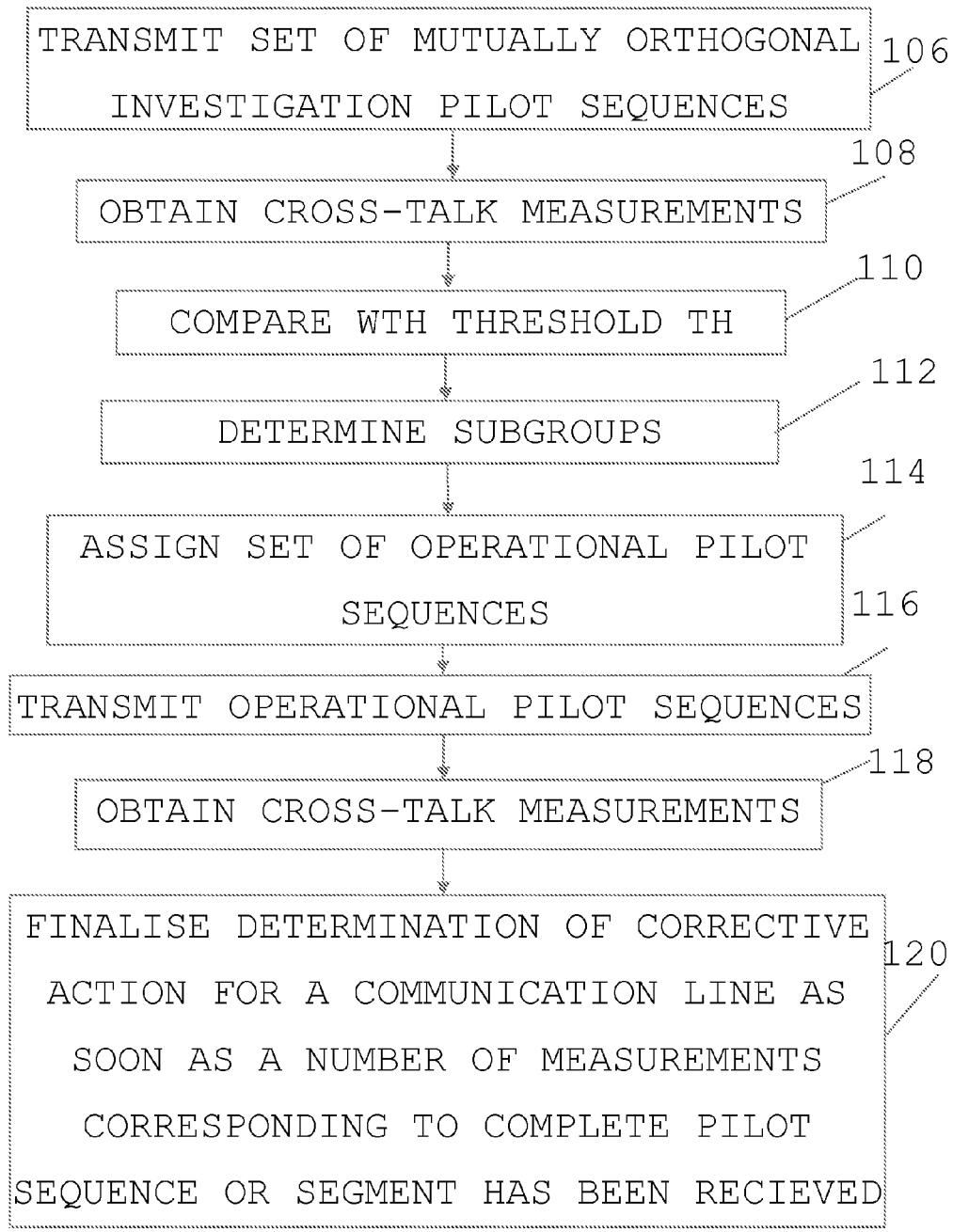

A third embodiment of the invention will now be described with reference being made to FIG. 11, which shows a set of investigating pilot sequences, and to FIG. 12, which shows a flow chart of a number of method steps being performed in the pilot sequence transmission control unit 54.

The investigation pilot sequences IS are here mutually orthogonal, provided in a Hadamard matrix, as many as the operational pilot sequences in the example of the first assignment principle and here also have the same lengths as in that example.

Here the method starts with the investigating sequence transmission control element 56 transmitting investigating pilot sequences to the modems via the transmitting unit 50 and communication interface 48, step 106. It here transmits the set of mutually orthogonal investigation sequences, i.e. every sequence transmitted to the communication lines 18, 20, 22, 24, 26, 28, 30 and 32 is orthogonal to every other sequence. This means that as an example the sequences in the whole matrix of FIG. 11 may be transmitted. Thereafter the subgroup determining element 60 obtains crosstalk measurements made on these pilot sequences. Every communication line thus receives a corresponding investigation pilot sequence. It here receives these measurements from the modems via the communication lines, communication interface 48 and receiving unit 52, step 108. It here receives and processes the measurements made on the complete set of investigation pilot sequences.

The subgroup determining element 60 thus compares the cross-talk measurements with a crosstalk threshold TH, step 110, and determines subgroups based on which communication lines that experience crosstalk from each other above the threshold, step 112.

Thereafter the subgroup determining element 60 continues and assigns a set of operational pilot sequences, step 114, which may be according to the first or the second principle. If the first principle is used, the assigned sequences will normally differ from the investigating sequences uses as is shown in FIGS. 6 and 11. However, he assigned sequences may in some exceptional instances be the same as those used as investigating pilot sequences, however in a different order in the Hadamard matrix, as shown in the example of FIG. 7 and FIG. 11.

Thereafter the operational sequences are transmitted by the operational sequence transmission control element 58 via the transmitting unit 50 and communication interface 48, step 116.

Then cross-talk measurements are obtained or received, step 118, by the corrective action determining element 62. However, the determination of cross-talk and corrective activity may be finalised as soon as measurements corresponding to the transmitted subsets have been received.

Corrective action may in the same way as described earlier involve providing settings for the receiving and transmitting units.

The corrective action determining element 62 can then finalise the determination of cross-talk for a certain communication line and perform a corrective action as soon as measurements from a complete pilot sequence or a complete segment has been received form this communication line, step 120. This means that it does not have to wait until measurements corresponding to the whole length of the pilot sequences in the set have been received, but may finalise for a subgroup as soon as a sufficient number of measurements has been received. This here also means that as only two symbols are needed for orthogonality for the operational pilot sequences in the first and second subsets SS1 and SS2, the corrective action determining element 62 may finalise the determination of a corrective action for a communication line in the first or second subgroup SG1 and SG2 as soon as two measurements have been received from that communication line. In a similar manner it may finalise the determination of a corrective action for a communication line in the third subgroup SG3 as soon as four measurements have been received from that communication line.

The invention has a number of advantages. Especially when the second assignment principle is used, it allows a vectoring system to maintain only one set of pilot sequences and benefit the reduced channel estimation time from a proper pilot sequence allocation, once the cable sizes are known. The cable sizes are usually known by the operators. It also allows estimating the channel of all the communication lines in the system without changing the pilot sequence. Then the channel estimation can be used for line identification. After line identification, the pilot sequences in the set are re-assigned to different lines according to the subgroups obtained by the line identification. Then it is possible to take a few error samples to estimate the channel of the communication lines in each cable. This would make the process much easier without the need of changing pilot sequences.

The invention also reduces the channel estimation time significantly and thereby reduces vectoring initialization time and tracking time significantly. This may also be used in updating pre-coder and cross-talk canceller coefficients more frequently.

This invention shortens the channel estimation time by properly assigning pilot sequences to communication lines based on the location of the communication lines with respect to the cables going out from the cabinet. It takes advantage of the fact that the crosstalk between different cables is negligible and therefore need not to be estimated. Two pilot sequence assignment principles or approaches have been given above to enable faster channel estimation. Basically, the principles or approaches guarantee mutual orthogonality between the communications lines in the same cable with short pilot sequences or a few pilot sequence elements. Then the number of measurements (i.e. error samples) for channel estimation can be limited by the number of lines in each cable, which can be much less than the total number of lines. The channel estimation time is thereby reduced with the pilot sequence assignment. For example, if the cable size is less than 100 communication lines, channel estimation time can be upper-bounded to about 8 seconds irrespective of how many cables there are in the vectoring system.

Figure 13:
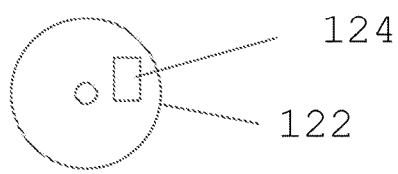

The pilot sequence transmission control unit and its entities may with advantage be provided in the form of a processor with associated program memory including computer program code for performing the functionality of the pilot sequence transmission control unit. It should be realized that this unit may also be provided in the form of hardware, like for instance in the form of an Application Specific Integrated Circuit (ASIC). The computer program code may also be provided on a computer-readable means, for instance in the form of a data carrier, like a CD ROM disc or a memory stick, which will implement the function of the above-described pilot sequence transmission control unit when being loaded into the above-mentioned program memory and run by the processor. One such computer program product in the form of a CD ROM disc 122 with such a computer program code 124 is schematically shown in FIG. 13.

The transmitting unit and the receiving unit may typically be a conventional VDSL2 transceiver. Furthermore, the transmitting unit and the receiving unit should have or at least support vectoring functionalities doing downstream precoding and/or upstream crosstalk cancellation. The communication interface may furthermore be a conventional subscriber line interface.

While the invention has been described in connection with what is presently considered to be most practical and preferred embodiments, it is to be understood that the invention is not to be limited to the disclosed embodiments and variations, but on the contrary, is intended to cover various modifications and equivalent arrangements. It is for instance possible to omit the investigating sequence transmission control element. It is also possible to implement the pilot sequence transmission control unit without the pilot sequence store. The various described way of obtaining communication line division information can be employed in all the described embodiments. Therefore the invention is only to be limited by the following claims.

The invention claimed is:
1. A method for limiting crosstalk between vectoring modems connected to a group of communication lines interconnecting the vectoring modems with a data network accessing device, the method comprising:
  obtaining, by the data network accessing device, information indicating a division of the group of communication lines into subgroups, wherein each subgroup includes two or more lines experiencing cross-talk from other lines in the same subgroup above a cross-talk level threshold;
  assigning, based on the information indicating the division of the group of communication lines into subgroups, a set of operational pilot sequences to the group of communication lines according to the division of the group of communication lines into subgroups, wherein the set of operational pilot sequences comprises a number of subsets, one for each subgroup, and wherein the lengths of the pilot sequences in a subset are set to correspond to the minimum length required for being mutually orthogonal;
  transmitting said set of operational pilot sequences on the communication lines between the vectoring modems and said data network accessing device, said pilot sequences being mutually orthogonal to each other at least within each subgroup, wherein each communication line receives a corresponding operational pilot sequence;
  obtaining a set of cross-talk measurement sequences related to the transmitted set of operational pilot sequences; and
  determining, for each subgroup, crosstalk and a corrective action based on measurements made for a number of sequence symbols, said number corresponding to the minimum number required for obtaining mutually orthogonal pilot sequences within the subgroup.

2. The method according to claim 1, wherein the information comprises cross-talk measurements corresponding to the measurement results from a set of mutually orthogonal investigation pilot sequences, the method further comprising comparing these measurements with said cross-talk level threshold and determining said subgroups of communication lines based on the comparison.

3. The method according to claim 2, further comprising:
  transmitting said set of mutually orthogonal investigation pilot sequences on the communication lines between the vectoring modems and said data network accessing device, wherein each communication line receives a corresponding investigation pilot sequence.

4. The method according to claim 2, wherein the length of the operational pilot sequences is longer than or equal to that of the set of investigation pilot sequences.

5. The method according to claim 4, wherein the step of determining corrective action is performed for a subgroup before all cross-talk measurements of the cross-talk measurement sequences have been received.

6. The method according to claim 5, wherein the operational pilot sequences each comprise a segment, and wherein the segment lengths of operational pilot sequences assigned to a subgroup is equal to or higher than the minimum number of elements for obtaining mutual orthogonality within the subgroup and lower than the minimum number required for obtaining mutual orthogonality within the whole group of communication lines.

7. The method according to claim 1, wherein the step of determining a corrective action for a subgroup comprises finalising the determining of a corrective action as soon as measurement results for the operational pilot sequences of this subgroup have been obtained.

8. The method according to claim 1, wherein the lengths of operational pilot sequences of a subset is equal to or higher than the minimum number of elements for obtaining mutual orthogonality within the subset and lower than the minimum number required for mutual orthogonality within the whole set of operational pilot sequences.

9. The method according to claim 1, wherein the number of sequence symbols for which cross-talk is determined and corrective action is performed with regard to one subgroup (i) is $L_i=4*\lceil N_i/4 \rceil$, wherein Ni is the number of lines in the subgroup and $\lceil N_i/4 \rceil$ means that $N_i/4$ is rounded up to the nearest higher integer.

10. The method according to claim 1, wherein the number of sequence symbols for which cross-talk is determined and corrective action is performed with regard to one subgroup (i) is $L_i=2^{\lceil log_2 N_i \rceil}$, and wherein Ni is the number of lines in the subgroup and $\lceil log_2 N_i \rceil$ means that $log_2 N_i$ is rounded up towards the nearest higher integer.

11. The method according to claim 1, wherein the step of determining corrective action comprises finalising the determining of a corrective action for a subgroup as soon as a number of cross-talk measurements of the corresponding cross-talk measurement sequence have been received, said number being equal to or larger than a minimum number for obtaining mutual orthogonality within the pilot sequence symbols used for the subgroup and smaller than a minimum number for obtaining mutual orthogonality within the pilot sequence symbols used for the whole group.

12. A data network accessing device for limiting crosstalk between vectoring modems connected to a group of communication lines interconnecting the vectoring modems with a data network accessing device, the data network accessing device for limiting crosstalk comprising:
  a processor and memory including instructions executable by the processor, whereby the device is operative to:
    obtain, by the data network accessing device, information indicating a division of the group of communication lines into subgroups, wherein each subgroup includes two or more lines experiencing cross-talk from other lines in the same subgroup above a cross-talk level threshold;
    assign, based on the information indicating the division of the group of communication lines into subgroups, a set of operational pilot sequences to the group of communication lines according to the division of the group of communication lines into subgroups, wherein the set of operational pilot sequences comprises a number of subsets, one for each subgroup, and wherein the lengths of the pilot sequences in a subset are set to correspond to the minimum length required for being mutually orthogonal;
    transmit said set of operational pilot sequences on the communication lines between the vectoring modems and said data network accessing device, said pilot sequences being mutually orthogonal to each other at least within each subgroup, wherein each communication line receives a corresponding operational pilot sequence;
    obtain a set of cross-talk measurement sequences related to the transmitted set of operational pilot sequences; and
    determine, for each subgroup, cross-talk and a corrective action based on measurements made for a number of sequence symbols, said number corresponding to the minimum number required for obtaining mutually orthogonal pilot sequences within the subgroup.

13. The device according to claim 12, wherein the information comprises cross-talk measurements corresponding to the measurement results from a set of mutually orthogonal investigation pilot sequences, the device being further operative to compare these measurements with said cross-talk level threshold and determine said subgroups of communication lines based on the comparison.

14. The device according to claim 13, wherein the device is further operative to provide the transmission of the set of mutually orthogonal investigation pilot sequences on the communication lines between the vectoring modems and said data network accessing device, wherein each communication line receives a corresponding pilot sequence.

15. The device for limiting crosstalk according to claim 13, wherein the length of the operational pilot sequences is longer than or equal to that of the set of investigation pilot sequences.

16. The device for limiting crosstalk according to claim 15, wherein the device is further operative to perform determining of corrective action before all cross-talk measurements of the cross-talk measurement sequences have been received.

17. The device for limiting crosstalk according to claim 12, wherein the device is further operative to finalise determining of a corrective action for a subgroup as soon as measurement results for all pilot sequences of this subgroup have been obtained.

18. The device for limiting crosstalk according to claim 12, wherein the number of sequence symbols for which cross-talk is determined and corrective action is performed with regard to one subgroup (i) is $L_i=4*\lceil N_i/4 \rceil$, wherein Ni is the number of lines in the subgroup and $\lceil N_i/4 \rceil$ means that $N_i/4$ is rounded up to the nearest higher integer.

19. The device for limiting crosstalk according to claim 12, wherein the number of sequence symbols on which the device is operative to determine cross-talk and perform corrective action for a subgroup (i) is $L_i=2^{\lceil log_2 N_i \rceil}$, wherein Ni is the number of lines in the subgroup and $\lceil log_2 N_1 \rceil$ means that $log_2 N_i$ is rounded up towards the nearest higher integer.

20. The device for limiting crosstalk according to claim 12, wherein the device is further operative to finalise the determining of corrective action for a subgroup as soon as a number of cross-talk measurements of the corresponding cross-talk measurement sequence have been received, said number being equal to or larger than a minimum number for obtaining mutual orthogonality within the pilot sequence symbols used for the subgroup and smaller than the minimum number for obtaining mutual orthogonality within the pilot sequence symbols used for the whole group.

21. The device for limiting cross-talk according to claim 12, further comprising a store for storing pilot sequences.

22. The device for limiting cross-talk according to claim 12, wherein it is provided as the network access device.

23. A non-transitory computer-readable medium that stores instructions for limiting crosstalk between vectoring modems connected to a group of communication lines interconnecting the vectoring modems with a data network accessing device, the instructions comprising computer program code on a data carrier which when run on a processor, causing the data network accessing device to:

obtain, by the data network accessing device, information indicating a division of the group of communication lines into subgroups, wherein each subgroup includes two or more lines experiencing cross-talk from other lines in the same subgroup above a cross-talk level threshold;

assign, based on the information indicating the division of the group of communication lines into subgroups, a set of operational pilot sequences to the group of communication lines according to the division of the group of communication lines into subgroups, wherein the set of operational pilot sequences comprises a number of subsets, one for each subgroup, and wherein the lengths of the pilot sequences in a subset are set to correspond to the minimum length required for being mutually orthogonal;

transmit said set of operational pilot sequences on the communication lines between the vectoring modems and said data network accessing device, said pilot sequences being mutually orthogonal to each other at least within each subgroup, wherein each communication line receives a corresponding operation pilot sequence;

obtain a set of cross-talk measurement sequences related to the transmitted set of operational pilot sequences; and determine, for each subgroup, cross-talk and a corrective action based on measurements made for a number of sequence symbols, said number corresponding to the minimum number required for obtaining mutually orthogonal pilot sequences within the subgroup.

* * * * *